United States Patent [19]

Spies et al.

[11] Patent Number: 5,006,636
[45] Date of Patent: Apr. 9, 1991

[54] PROCESS FOR THE PRODUCTION OF $SiO_2$ CONTAINING POLYBENZAMIDES

[75] Inventors: Manfred Spies, Marburg; Walter Heitz, Kirchhain, both of Fed. Rep. of Germany

[73] Assignee: Bayer Aktiengesellschaft, Leverkusen, Fed. Rep. of Germany

[21] Appl. No.: 299,606

[22] Filed: Jan. 23, 1989

[30] Foreign Application Priority Data

Jan. 28, 1988 [DE] Fed. Rep. of Germany ....... 3802470

[51] Int. Cl.$^5$ ............................................... C08G 69/04
[52] U.S. Cl. .................................... 528/320; 524/100; 524/443; 524/606; 528/314; 528/331

[58] Field of Search ....................... 528/320, 314, 331; 524/100, 443, 606

[56] References Cited

U.S. PATENT DOCUMENTS 4,696,999 9/1987 Spies et al. ........................ 528/320

Primary Examiner—Harold D. Anderson
Attorney, Agent, or Firm—Connolly and Hutz

[57] ABSTRACT

The invention relates to a process for the production of poly-(1,4-benzamide) in admixture with $SiO_2$ by polycondensation of 4-aminobenzoic acid in the presence of $SiCl_4$ in 1,3-dimethyltetrahydro-2(1H)-pyrimidinone in the presence of salts, such as lithium chloride or calcium chloride.

2 Claims, No Drawings

PROCESS FOR THE PRODUCTION OF SIO₂ CONTAINING POLYBENZAMIDES

This invention relates to a process for the production of relatively high molecular weight poly-(1,4-benzamide) in admixture with $SiO_2$ by polycondensation of 4-aminobenzoic acid, characterized in that 4-aminobenzoic acid is polycondensed in the presence of $SiCl_4$, metal salts, such as lithium chloride or calcium chloride, in 1,3-dimethyltetra- hydro-2(!H)-pyrimidinone as solvent at temperatures of 50 to 200° C. and preferably at temperatures of 80 to 120° C. and under pressure of $10^{-3}$ to bar 10 bar, preferably 1 bar.

Through the use of 1,3-dimethyltetrahydro-2(2H)-pyrimidinone as solvent, the synthesis may be carried out in homogeneous phase with particularly high molecular weights in contrast to other solvents typically used in the synthesis of polyamides, such as for example N-methyl pyrrolidone or N,N-dimethyl acetamide. The poly-(1,4-benzamide) obtained is present in liquid crystalline phase in the solvent.

The reaction temperature may even be reached in stages, for example by increasing the temperature in steps of 5 to 50° C. and preferably in steps of 10° to 20° C.

0.5 to 2 mol $SiCl_4$ and preferably 0.8 to 1.5 mol $SiCl_4$ is used per mol aminobenzoic acid.

Poly-(1,4-benzamide) is known. It may be synthesized either by a multistep process (for example Macromolecules 10, pages 1390 to 1398 (1977)) or with relatively expensive phosphorus compounds (for example Journ. Polym. Sci.: Polym. Chem. Ed. 13, 1373 to 1380 (1975)).

$SiCl_4$ is a known condensation agent for the synthesis of polyamides in heterogeneous phase (precipitation condensation, for example Makromol Chem. Rapid Commun 6, 111–118 (1985), DE-OSS 35 05 903 and 35 05 904).

The process according to the invention takes place in a single step. The final temperature required for the reaction may be reached by slowly increasing the temperature during the reaction. The process according to the invention may be carried out at pressures of $1 \times 10^{-3}$ to 10 bar and is preferably carried out at atmospheric pressure. At temperatures above the boiling point of the reaction mixture, it may be necessary to apply an excess pressure.

A reaction solvent suitable for obtaining high molecular weights is a nitrogen heterocycle, such as 1,3-dimethyltetrahydro-2(1H)-pryimidinone. Another suitable solvent is 1,3-dimethyltetrahydro-2(1H)-pryimidinone in admixture with organic bases inert under the reaction conditions, for example pyridine.

The concentration of the aminobenzoic acid in the solvent is 0.1 to 1.5 mol/l and preferably 0.4 to 0.8 mol/l.

The concentration of metal salt in the solvent is 0.1 to 3 mol/l and preferably 0.8 to 1.6 mol/l.

Lyotropic solutions of polybenzamides, metal salts (for example LiCl) and solvent are formed during the reaction.

The solutions also contain $SiO_2$ and may be directly processed to films or fibers. The polymer molecules are oriented (aligned substantially parallel) in these lyotropic solutions. This property is of technical significance because, for example, fibers having high modulus values are obtained in this way. The advantage over the prior art lies in the fact that the reaction solution can be directly processed. The $SiO_2$ is distributed extremely finely and uniformly in the material. It may be regarded as an active filler.

The $SiO_2$ may be separated off by precipitation of the polybenzamides in a precipitation bath and subsequent dissolution in $H_2SO_4$ or N-methyl pyrrolidone/HCl and filtration. The polybenzamides may be isolated from these solutions in pure form.

The reaction according to the invention may be represented, for example, by the following reaction scheme:

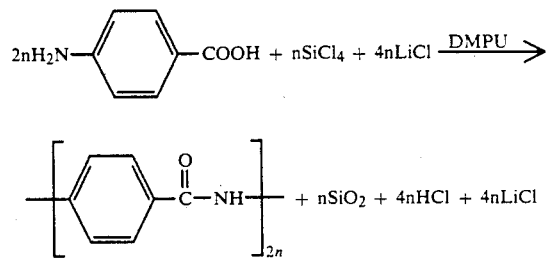

DMPU = 1,3-dimethyltetrahydro-2(1H)-pyrimidinone

The reaction gives polybenzamides having degrees of polymerization of 2 to 400 and preferably of 5 to 200. The molecular weight is substantially regulated through the molar ratio of aminobenzoic acid to halide.

The molecular weights obtained are determined through the inherent viscosity as measured at 30° C. on solutions of 0.5 g polyamide in 100 ml conc. $H_2SO_4$.

The polyamides obtained in accordance with the invention and the mixtures with $SiO_2$ may be technically used in known manner.

EXAMPLE A 2.89 g (68.25 mmol) LiCl are dissolved in 50 ml 1,3-dimethyltetrahydro-2 (1H)-pyridinone in a fully heated 100 ml three-necked flask equipped with a KPG stirrer, reflux condenser and septum. 4.68 g (34.125 mmol) 4-aminobenzoic acid are then added and dissolved 2.93 ml (25.59 mmol) silicon tetrachloride are added dropwise at room temperature (21° C.), followed by stirring for 24 hours at room temperature. The mixture is then heated for 24 hours to 50° C., after which the reaction temperature o-f 100° C. was maintained for 48 hours.

A lyotropic solution of poly-(1,4-benzamide) in 1,3-dimethyltetrahydro-2(1H)-pyrimidinone/LiCl is obtained The $SiO_2$ may be separated off by stirring the solution for 24 hours in 500 ml water, filtering the residue under suction and then refluxing for 6 hours in THF. The product is refiltered under suction and dried. 5.33 g of a mixture of poly-(1,4-benzamide) and silicon dioxide are obtained. This mixture is dissolved in 300 ml conc. sulfuric acid and the resulting solution filtered through a glass frit. The poly-(1,4-benzamide) is precipitated in water, filtered under suction, washed thoroughly with hot water, methanol and acetone and dried. Yield: 3.35 g =82%, inherent viscosity: 1.1.

EXAMPLE B 2.89 g (68.25 mmol) LiCl are dissolved in 50 ml 1,3-dimethyltetrahydro-2(1H)-pyrimidinone and 8.09 ml (102.36 mmol) pyridine (as base) in a fully heated 100 ml three-necked flask equipped with a KPG stirrer, reflux condenser and septum. 4.68 g (34.125 mmol) 4-aminobenzoic acid are then added and dissolved 2 93 ml (25.59 mmmol) silicon tetrachloride are added dropwise at room temperature (21° C), followed by stirring for 24 hours at room temperature. The reaction mixture is then heated for 24 hours to 50° C, after which the reaction temperature of 100° C. is maintained for 24 hours.

A lyotropic solution of poly-(1,4-benzamide) in 1,3-dimethyltetrahydro-2{1H}-pyrimidinone/LiCl is obtained.

The SiO2 may be separated off by stirring the reaction mixture for 24 hours in 500 ml 2N HCl, filtering the residue under suction and washing thoroughly with water and acetone. The product is then refluxed for 6 hours in THF, refiltered under suction and dried. 5.01 g of a mixture of poly-(1,4benzamide) and silicon oxide are obtained. The mixture is dissolved in 300 ml. conc. sulfuric acid and the resulting solution filtered through a glass frit. The poly-(1,4benzamide) is precipitated in water, filtered under suction, washed thoroughly with hot water, methanol and acetone and dried. Yield: 2.91 g =72%, inherent viscosity: 0.92.

EXAMPLE C 1.91 g (45 mmol) LiCl are dissolved in 50 ml N,N-dimethyl acetamide in a fully heated 100 ml three-necked flask equipped with a KPG stirrer, reflux condenser and septum. 6.16 g (45 mmol) 4-aminobenzoic acid are then added and dissolved. 3.13 ml (27 mmol) silicon tetrachloride are then added dropwise while cooling with ice. The reaction temperature of 130° C. is then maintained for 24 hours.

For working up, the reaction mixture is stirred in 500 ml water for 6 hours, the residue is filtered under suction and washed thoroughly with water and acetone and dried.

1.6 g of a mixture of poly-(1,4-benzamide) and silicon dioxide are obtained. The mixture is dissolved in 100 ml conc. sulfuric acid and the resulting solution filtered through a glass frit. The poly-(1,4-benzamide) is precipitated in water, filtered under suction, washed thoroughly with hot water, methanol and acetone and dried. Yield: 0.49 g =10%, inh. viscosity: 0.08.

We claim:

1. The process for the production of relatively high molecular weight poly-(1,4-benzamides) in admixture with $SiO_2$ by polycondensation of 4-aminobenzoic acid, which comprises polycondensing 4-aminobenzoid acid in the presence of (i) $SiCl_4$, (ii) a metal salt selected from the group consisting of $CaCl_2$ and LiCl, and (iii) 1,3-dimethyltetrahydro-2(1H)-pyrimidinone as solvent at temperature of 50° to 200° C. and pressures of $1 \times 10^{-3}$ to 10 bar, with the amount of $SiCl_4$ being 0.5 to 2 mol per mol aminobenzoid acid.

2. A process as claimed in claim 1 wherein the temperature is reached in steps.

* * * * *